US012613199B2

(12) United States Patent
Wang et al.

(10) Patent No.: US 12,613,199 B2
(45) Date of Patent: Apr. 28, 2026

(54) MOVABLE VISUAL INSPECTION DEVICE FOR SHIELD MACHINES

(71) Applicants: China Railway Sunward Engineering Equipment Co., Ltd., Guangzhou (CN); Xiangtan University, Xiangtan (CN)

(72) Inventors: Dinghua Wang, Guangzhou (CN); Tianyi Luo, Guangzhou (CN); Hengfeng Qin, Xiangtan (CN)

(73) Assignees: China Railway Sunward Engineering Equipment Co., Ltd., Guangzhou (CN); Xiangtan University, Xiangtan (CN)

( * ) Notice: Subject to any disclaimer, the term of this patent is extended or adjusted under 35 U.S.C. 154(b) by 121 days.

(21) Appl. No.: 18/775,089

(22) Filed: Jul. 17, 2024

(65) Prior Publication Data

US 2025/0146954 A1 May 8, 2025

(30) Foreign Application Priority Data

Nov. 3, 2023 (CN) .......................... 202311452653.9

(51) Int. Cl.
*G01N 21/954* (2006.01)
*B60L 53/16* (2019.01)
(Continued)

(52) U.S. Cl.
CPC ............ *G01N 21/954* (2013.01); *B60L 53/16* (2019.02); *E21D 9/003* (2013.01); *E21D 9/0607* (2013.01); *E21D 9/0635* (2013.01); *G01N 21/8851* (2013.01); *G01N 21/9009* (2013.01); *B60L 2200/26* (2013.01); *G01N 2021/9548* (2013.01); *G01N 2201/0216* (2013.01); *G01N 2201/0225* (2013.01); *G01N 2201/0227* (2013.01)

(58) Field of Classification Search
CPC ............ G01N 21/954; G01N 21/8851; G01N 21/9009; G01N 2021/9548; G01N 2201/0216; G01N 2201/0225; G01N 2201/0227; G01N 21/84; G01N 21/01; G01N 21/15; B60L 53/16; B60L 2200/26; E21D 9/003; E21D 9/0607; E21D 9/0635
USPC ...................................... 356/241.1
See application file for complete search history.

(56) References Cited

U.S. PATENT DOCUMENTS 3,414,178 A * 12/1968 Coutant ................. G03B 21/32
                                                              226/62
2024/0110423 A1* 4/2024 Müller ................. E05F 11/385

* cited by examiner

*Primary Examiner* — Md M Rahman
(74) *Attorney, Agent, or Firm* — Hemisphere Law, PLLC

(57) ABSTRACT

The present invention discloses a movable visual inspection device for shield machines, comprising a rail and an inspection platform. The rail is installed on a shield tail, and the inspection platform includes a bottom plate, a shell, a cleaning mechanism, a power storage control system, and a traveling mechanism. Inside the shell is a visual inspection mechanism with a camera box, a camera, and a stabilizer component. The traveling mechanism drives the bottom plate along the rail. The cleaning mechanism, consisting of a glass sheet, a reel driving part, and a cleaning film, keeps the camera lens clear. The reel driving part rotates the cleaning film, which slides against the glass sheet on the camera box. This invention enables multi-faceted and multi-angle visual inspection of shield machine segments, ensures a clear camera lens, facilitates automatic cleaning and inspection position adjustment, and enhances working efficiency and inspection effectiveness.

10 Claims, 8 Drawing Sheets

(51) Int. Cl.

| | |
|---|---|
| *E21D 9/00* | (2006.01) |
| *E21D 9/06* | (2006.01) |
| *G01N 21/88* | (2006.01) |
| *G01N 21/90* | (2006.01) |

MOVABLE VISUAL INSPECTION DEVICE FOR SHIELD MACHINES

TECHNICAL FIELD

The invention relates to the technical field of shield machine inspection, in particular to a movable visual inspection device for shield machines.

BACKGROUND

Shield machine is a large-scale key equipment in tunnel construction, and its segment installation quality directly affects the stability and safety of tunnel engineering. In order to improve the quality of segment installation, it is usually necessary to install a visual inspection device on the shield machine to inspect the segment in many aspects and angles.

In the current technology, the visual inspection devices are all fixedly installed on the shield machine, so that movable inspection cannot be realized, which limits the inspection range and flexibility; at the same time, the existing visual inspection device lacks automatic cleaning of camera lens, and the cleaning of shielding plate in the harsh environment of shield machine is far from enough, which restricts the working efficiency and inspection effect of visual inspection device.

Therefore, a movable visual inspection device for shield machines is proposed.

SUMMARY

The purpose of the present invention is to provide a movable visual inspection device for shield machines, aiming at solving or improving at least one of the above technical problems.

In order to achieve the above purpose, the invention provides the following scheme: the present invention provides a movable visual inspection device for shield machines, which comprises a rail and an inspection platform, wherein the rail is installed on a shield tail; the inspection platform comprises a bottom plate arranged on the rail, and the bottom plate is provided with a shell, a cleaning mechanism, a power storage control system and a traveling mechanism; the shell is internally provided with a visual inspection mechanism; and the traveling mechanism is used for driving the bottom plate to move along the rail;

the visual inspection mechanism comprises a camera box, a camera and a stabilizer component, wherein the camera is installed in the camera box through the stabilizer component, and the camera box is installed in the shell; the cleaning mechanism comprises a glass sheet, a reel driving part and a cleaning film; the reel driving part is installed on the bottom plate and used for driving the cleaning film to rotate; the bottom surface of the cleaning film is in sliding contact with the glass sheet, and the glass sheet is installed on the camera box and located above the lens of the camera; the shell is provided with an opening, and the opening is arranged opposite to the lens of the camera;

the camera, the stabilizer component, the traveling mechanism and the reel driving part are all electrically connected with the power storage control system.

According to the movable visual inspection device for shield machines provided by the present invention, the power storage control system comprises an energy mechanism and a control mechanism; the energy mechanism comprises a telescopic plug component, an energy storage component and a charging head; the fixed end of the telescopic plug component is installed in the shield tail, and the control mechanism, the energy storage component and the charging head are all installed on the bottom plate;

the telescopic end of the telescopic plug component is plugged with the charging head; the charging head, the telescopic plug component, the camera, the stabilizer component, the traveling mechanism, the reel driving part and the energy storage component are all electrically connected with the control mechanism.

According to the movable visual inspection device for shield machines provided by the present invention, the traveling mechanism comprises a traveling motor, a gear shaft and a traveling wheel;

the traveling motor is installed on the bottom plate, and the first transmission oblique bevel gear is installed on the output shaft of the traveling motor; and the traveling motor is electrically connected with the control mechanism;

the gear shaft is rotatably connected to the bottom plate, and the top and bottom of the gear shaft are respectively provided with the second transmission oblique bevel gear and an active traveling bevel gear; the second transmission oblique bevel gear is in meshing transmission with the first transmission oblique bevel gear; and the active traveling bevel gear is in meshing transmission with the rail;

at least four traveling wheels are arranged, the traveling wheels are rotatably connected to the bottom plate through a wheel axle, the four traveling wheels are symmetrically arranged on both sides of the rail, and the traveling wheels are in meshing transmission with the rail.

According to the movable visual inspection device for shield machines provided by the present invention, the rail is provided with a plurality of sections, and the sections of the rail are detachably connected end to end in sequence; the rail comprises a base rail installed on the shield tail, a gear rail is installed on the base rail, and a wheel rail is installed on the gear rail;

a plurality of rail fixing heads are installed between the base rail and the shield tail, and a plurality of sections of the base rail are detachably connected end to end in sequence; the active traveling bevel gear is in meshing transmission with the gear rail; and the traveling wheel is in meshing transmission with the wheel rail.

According to the movable visual inspection device for shield machines provided by the present invention, the reel driving part comprises a film shaft base installed on the bottom plate, and the film shaft base is installed on one side of the camera box; the film shaft base is provided with a film output reel, a tensioning part, a sealing part, a film input reel, a reel motor and a plurality of film shafts; the reel motor is installed on the film shaft base through the reel motor base;

the reel motor is electrically connected with the control mechanism; the output shaft of the reel motor is in transmission connection with the film input reel through a coupling, one end of the cleaning film is installed on the film input reel, and the other end is installed on the film output reel; and the middle section of the cleaning film penetrates around a plurality of film shafts, the tensioning part and the sealing part; the film shaft base is provided with a plurality of scrapers which are in sliding contact with the surface of the cleaning film;

the tensioning part comprises two tensioner rear ends, and the two tensioner rear ends are respectively installed on both sides of the film shaft base, and tensioner front ends are installed on the tensioner rear ends, and an elastic piece connected with the tensioner front end is installed in the tensioner rear end, and the tensioner front end is in sliding contact with the surface of the cleaning film;

the sealing part comprises two impeller shells, and the two impeller shells are respectively installed on two sides of the film shaft base, an elastic impeller is arranged in the impeller shell, and a torsion spring is installed between the two sides of the elastic impeller and the inner wall of the impeller shell; and the cleaning film is abutted by the elastic impeller.

According to the movable visual inspection device for shield machines provided by the present invention, the camera box comprises a camera box body and a camera box upper baffle, wherein the camera box body is installed in the shell, and the camera box upper baffle is installed at the top of the camera box body; the film shaft base is installed at one side of the camera box body; the glass sheet is installed on the camera box body, and the glass sheet is located right above the lens of the camera;

the stabilizer component comprises a stabilizer front arm, a stabilizer middle arm, a stabilizer rear arm and a stabilizer base; the stabilizer rear arm is installed in the camera box body through the stabilizer base, one end of the stabilizer front arm is installed on the stabilizer middle arm, and the other end is installed with the camera, and one end of the stabilizer middle arm far away from the stabilizer front arm is installed on the stabilizer rear arm.

According to the movable visual inspection device for shield machines provided by the present invention, the shell comprises a platform shell, a sealing shell and a back cover; the platform shell is installed on the bottom plate, and the sealing shell and the back cover are both installed on the platform shell; the film shaft base is installed in the sealing shell, and the top of the platform shell is provided with the opening.

According to the movable visual inspection device for shield machines provided by the present invention, the telescopic plug component comprises a telescopic plug shell, a charging plug and a telescopic pushing rod; the telescopic plug shell is installed in the shield tail, and the top surface of the telescopic plug shell is arranged flush with the plane of the shield tail; the telescopic pushing rod is installed in the telescopic plug shell, the telescopic pushing rod is electrically connected with the control mechanism, the charging plug is installed at the telescopic end of the telescopic pushing rod, and the charging plug is plugged with the charging head;

the charging head comprises a plug main body and four copper sheets, wherein the four copper sheets are symmetrically installed on the plug main body, the plug main body is electrically connected with the control mechanism, and both sides of the copper sheets are set as inclined planes.

According to the movable visual inspection device for shield machines provided by the present invention, at least two oil boxes are installed on the bottom plate, and the oil boxes are used for meshing and lubricating the traveling wheels and wheel rails.

According to the movable visual inspection device for shield machines provided by the present invention, a drying component is installed in the platform shell.

The present invention discloses the following technical effects:

According to the present invention, the traveling mechanism drives the bottom plate to move along the rail, and then drives the visual inspection mechanism to move on the rail, so that the inspection image acquisition is more flexible, the image of the shield tail segment can be acquired from multiple angles, and the inspection efficiency is improved; power is supplied to the components in the device through the power storage control system, and at the same time, the automatic control of components such as camera, stabilizer component, traveling mechanism and reel driving part is realized, so as to improve the operation effect of the device;

according to the present invention, the camera is installed on the stabilizer component, and the camera and the stabilizer component are installed in the camera box, so that the camera is kept stable in framing, and meanwhile, the airtightness is ensured, so that the camera is waterproof and moisture-proof, and the imaging effect is improved;

when the present invention is used, when it is inspected that the pictures taken by the camera are unclear and there are many obstructions, the power storage control system controls the reel driving part to start, and the polluted cleaning film in front of the lens is moved into the film input reel; at the same time, the camera starts shooting until the pictures taken by the camera are clear and free from impurities and obstructions, and then the power storage control system controls the reel driving part to stop working, thus realizing the automatic cleaning of the camera, effectively reducing the manual operation intensity and improving the intelligent performance of the device;

the present invention can realize multi-faceted and multi-angle visual inspection of the shield machine segment, ensure that the camera lens is clear and unobstructed, realize automatic cleaning of the camera and automatic adjustment of the inspection position, and improve the working efficiency and inspection effect.

BRIEF DESCRIPTION OF DRAWINGS

In order to explain the embodiments of the present invention or the technical scheme in the current technology more clearly, the drawings needed in the embodiments will be briefly introduced below. Obviously, the drawings described below are only some embodiments of the present invention, and other drawings can be obtained according to these drawings without creative work for ordinary people in the field.

Among them, 1. shield tail; 2. rail; 201. base rail; 202. wheel rail; 203. gear rail; 204. rail fixing head; 3. inspection platform; 4. camera; 5. glass sheet; 6. cleaning film; 7. energy storage component; 8. charging head; 801. plug main body; 802. copper sheet; 9. bottom plate; 10. traveling motor; 11. gear shaft; 12. traveling wheel; 13. the first transmission oblique bevel gear; 14. the second transmission oblique bevel gear; 15. active traveling bevel gear; 16. wheel axle; 17. film shaft base; 18. oil box; 19. film output reel; 20. film input reel; 21. reel motor; 22. film shaft; 23. tensioner rear end; 24. tensioner front end; 25. impeller shell; 26. elastic impeller; 28. camera box body; 29. camera box upper baffle; 30. stabilizer front arm; 31. stabilizer middle arm; 32. stabilizer rear arm; 33. stabilizer base; 34. platform shell; 35. sealing shell; 36. back cover; 37. telescopic plug shell; 38. charging plug; 39. telescopic pushing rod.

DETAILED DESCRIPTION OF EMBODIMENTS

In the following, the technical scheme in the embodiment of the present invention will be clearly and completely described with reference to the attached drawings. Obviously, the described embodiment is only a part of the embodiment of the invention, but not the whole embodiment. Based on the embodiments in the present invention, all other embodiments obtained by ordinary technicians in the field without creative labor belong to the scope of protection of the present invention.

In order to make the above purposes, features and advantages of the present invention more obvious and easy to understand, the present invention will be further described in detail with the attached drawings and specific embodiments.

Figure 1:
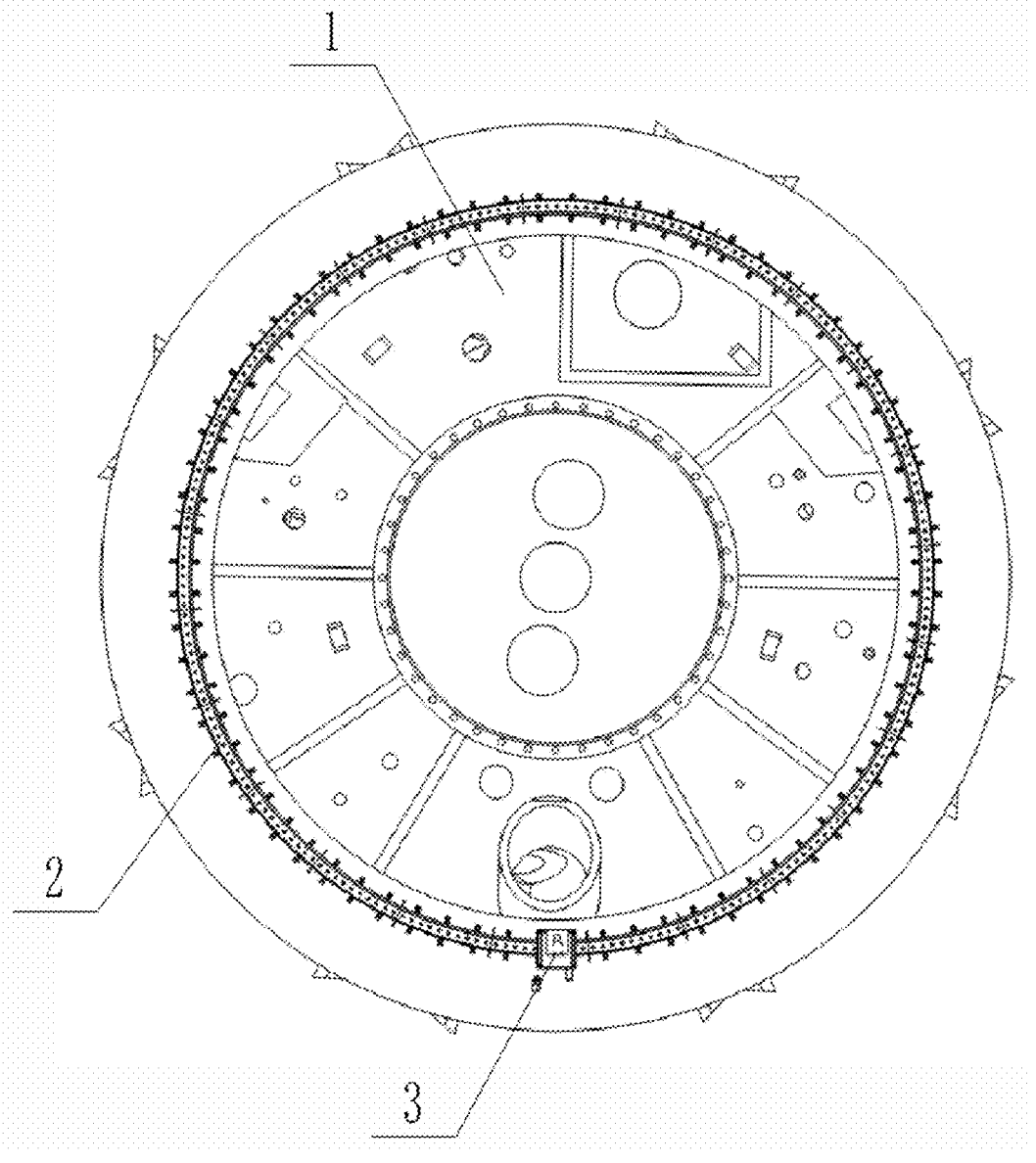
FIG. 1 is a schematic structural diagram of the present invention.
Figure 2:
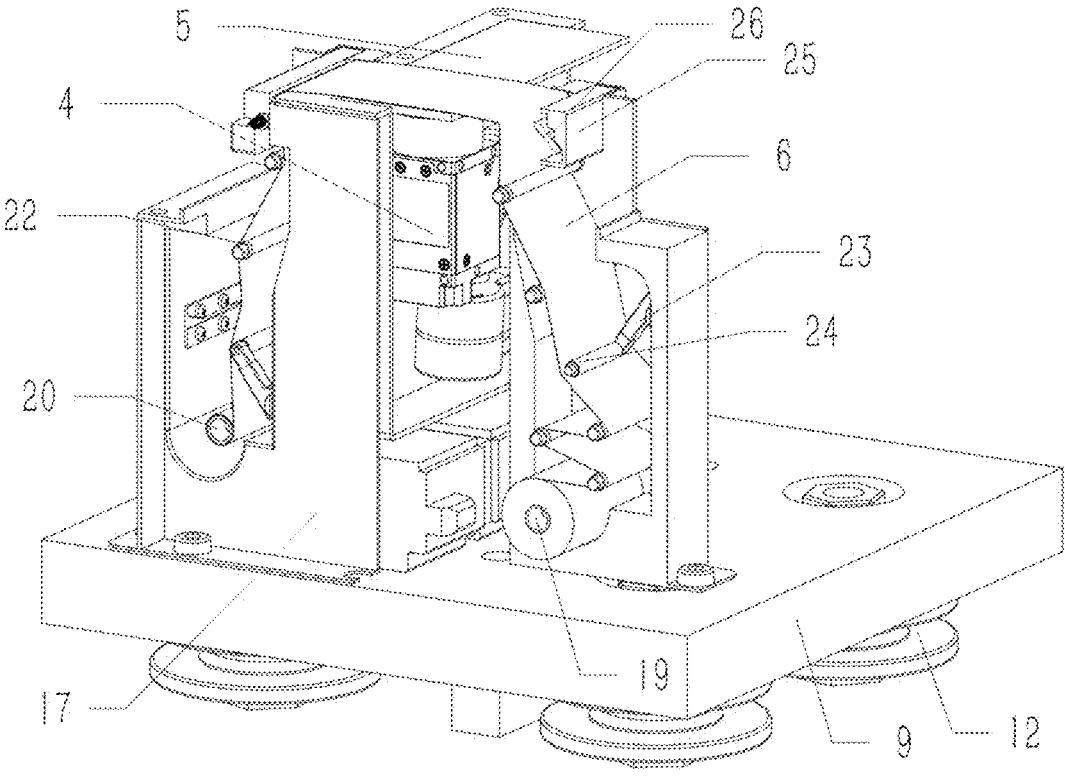
FIG. 2 is a schematic diagram of the installation of the reel driving part and the cleaning film in the present invention.
Figure 3:
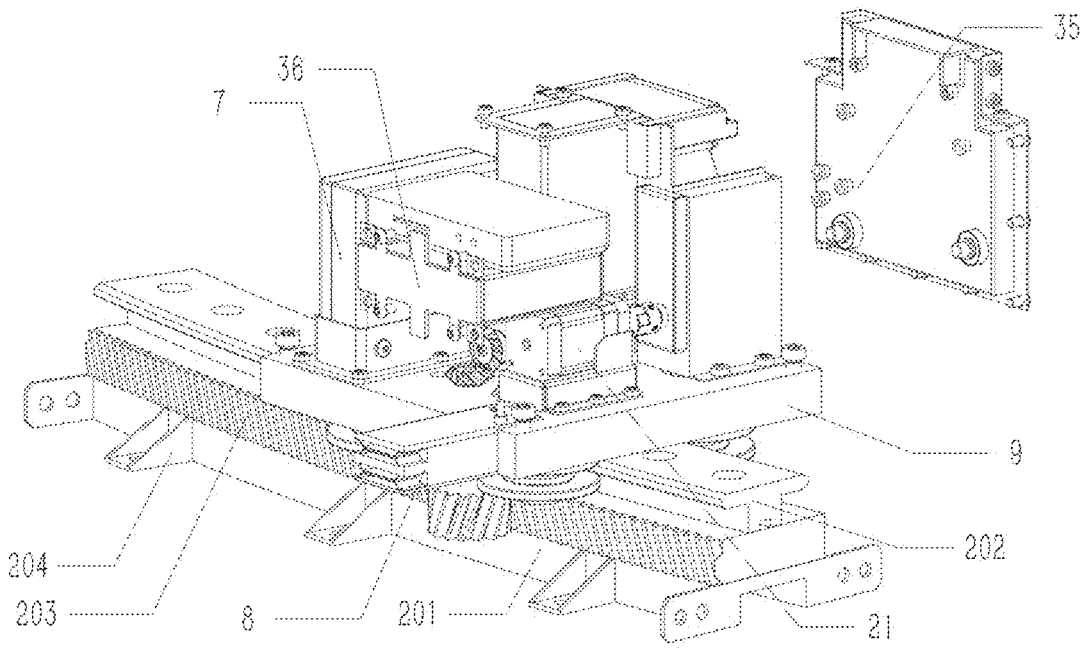
FIG. 3 is a schematic diagram of the installation of the rail and the inspection platform in the present invention.
Figure 4:
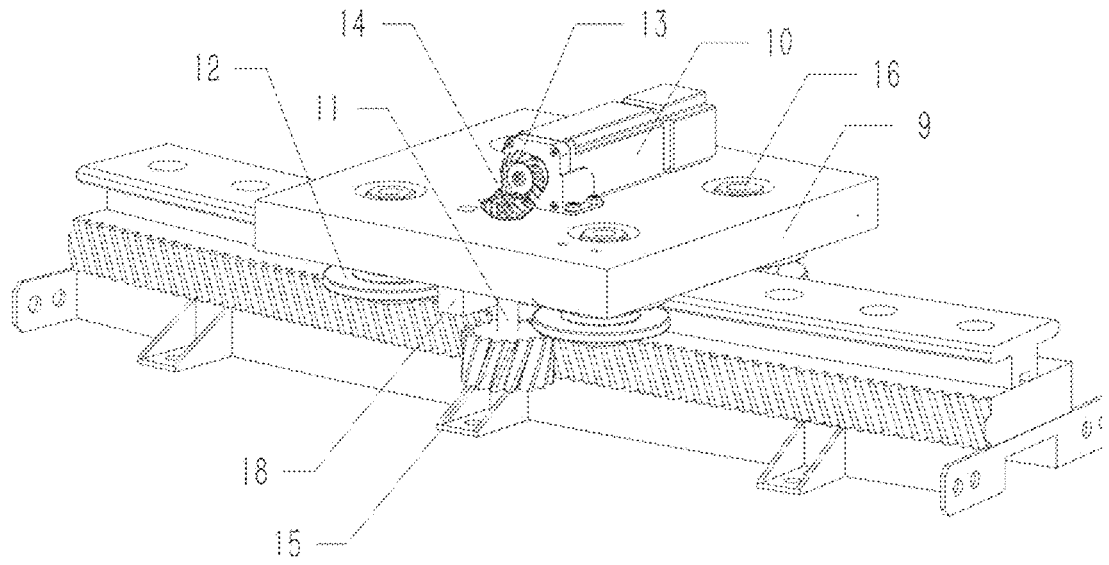
FIG. 4 is a schematic structural diagram of the traveling mechanism in the present invention.
Figure 5:
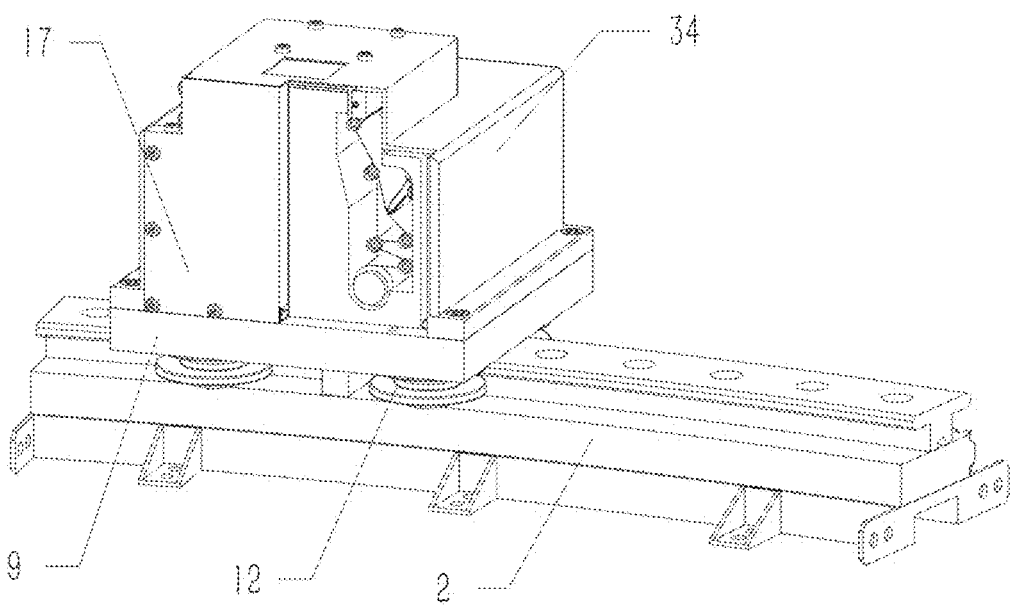
FIG. 5 is a schematic diagram of the installation of the platform shell and the bottom plate in the present invention.
Figure 6:
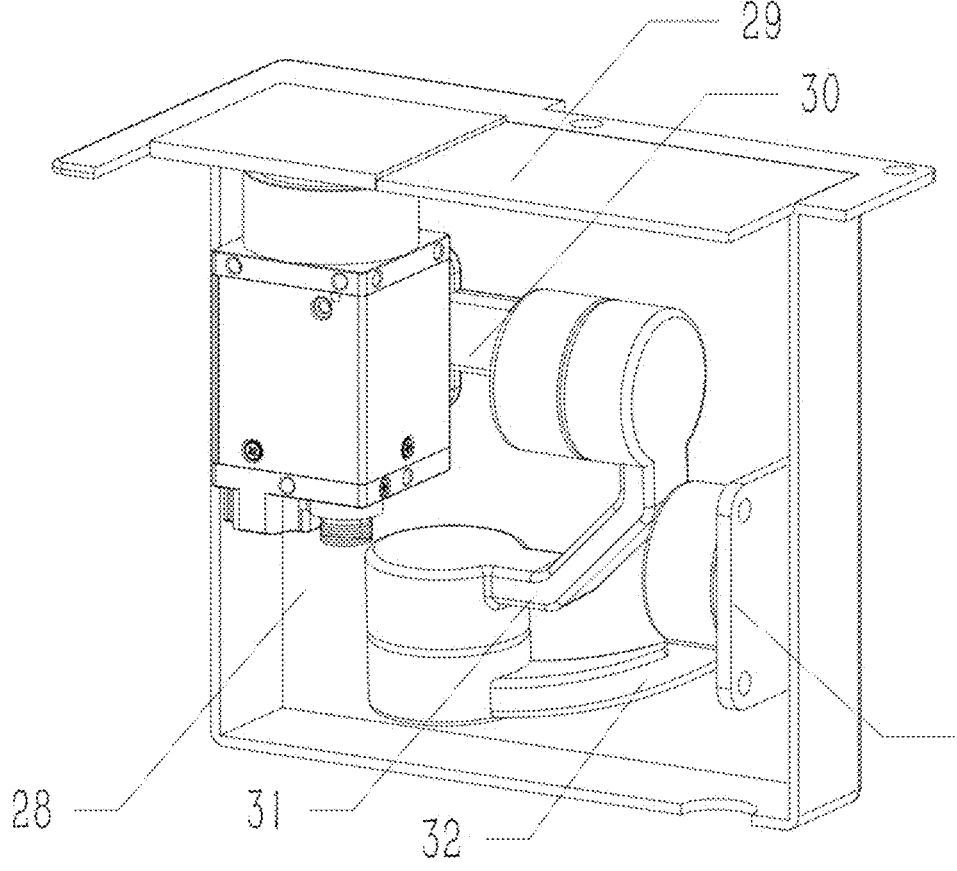
FIG. 6 is a schematic diagram of the installation of the camera box and the stabilizer component in the present invention.
Figure 7:
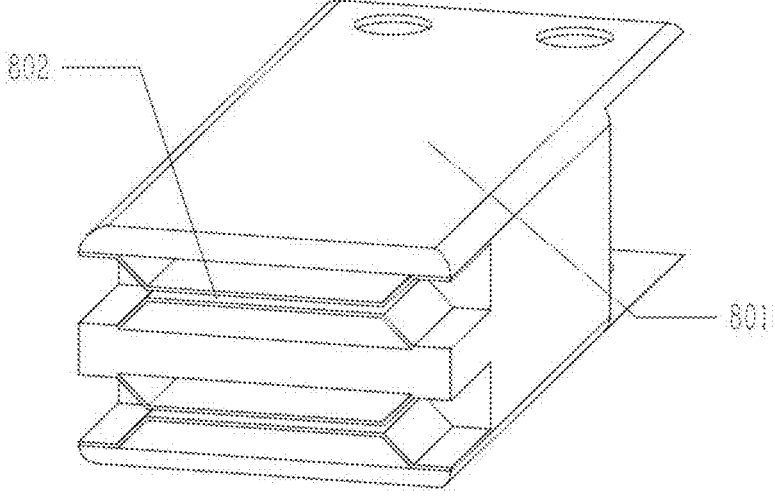
FIG. 7 is a schematic structural diagram of the charging head in the present invention.
Figure 8:
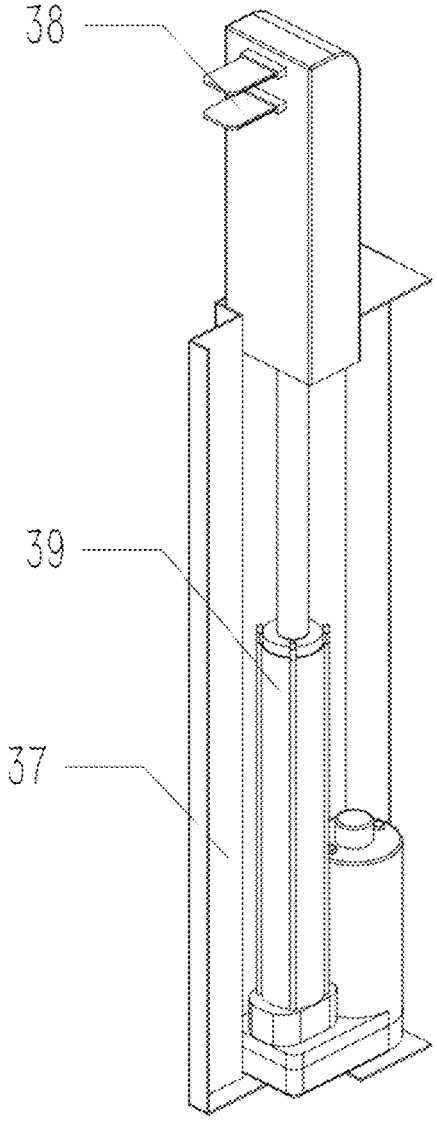
FIG. 8 is a structural schematic diagram of the telescopic plug component in the present invention.

Referring to FIGS. 1-8, the present invention provides a movable visual inspection device for shield machines, and it comprises a rail 2 and an inspection platform 3, wherein the rail 2 is installed on a shield tail 1; the inspection platform 3 comprises a bottom plate 9 arranged on the rail 2, and the bottom plate 9 is provided with a shell, a cleaning mechanism, a power storage control system and a traveling mechanism; the shell is internally provided with a visual inspection mechanism; and the traveling mechanism is used for driving the bottom plate 9 to move along the rail 2;

the visual inspection mechanism comprises a camera box, a camera 4 and a stabilizer component, wherein the camera 4 is installed in the camera box through the stabilizer component, and the camera box is installed in the shell; the cleaning mechanism comprises a glass sheet 5, a reel driving part and a cleaning film 6; the reel driving part is installed on the bottom plate 9 and used for driving the cleaning film 6 to rotate; the bottom surface of the cleaning film 6 is in sliding contact with the glass sheet 5, and the glass sheet 5 is installed on the camera box and located above the lens of the camera 4; the shell is provided with an opening, and the opening is arranged opposite to the lens of the camera 4;

the cleaning film 6 is soft and transparent, does not affect that image of the camera 4, and plays a role in protecting and isolating the glass sheet 5;

the camera 4, the stabilizer component, the traveling mechanism and the reel driving part are all electrically connected with the power storage control system;

with this arrangement, according to the present invention, the traveling mechanism drives the bottom plate 9 to move along the rail 2, and then drives the visual inspection mechanism to move on the rail 2, so that the inspection image acquisition is more flexible, the image of the shield tail 1 segment can be acquired from multiple angles, and the inspection efficiency is improved; power is supplied to the components in the device through the power storage control system, and at the same time, the automatic control of components such as camera 4, stabilizer component, traveling mechanism and reel driving part is realized, so as to improve the operation effect of the device;

according to the present invention, the camera 4 is installed on the stabilizer component, and the camera 4 and the stabilizer component are installed in the camera box, so that the camera 4 is kept stable in framing, and meanwhile, the airtightness is ensured, so that the camera is waterproof and moisture-proof, and the imaging effect is improved;

when the present invention is used, when it is inspected that the pictures taken by the camera 4 are unclear and there are many obstructions, the power storage control system controls the reel driving part to start, and the polluted cleaning film 6 in front of the lens is moved into the film input reel 20; at the same time, the camera 4 starts shooting until the pictures taken by the camera 4 are clear and free from impurities and obstructions, and then the power storage control system controls the reel driving part to stop working, thus realizing the automatic cleaning of the camera 4, effectively reducing the manual operation intensity and improving the intelligent performance of the device;

the present invention can realize multi-faceted and multi-angle visual inspection of the shield machine segment, ensure that the camera 4 lens is clear and unobstructed, realize automatic cleaning of the camera 4 and automatic adjustment of the inspection position, and improve the working efficiency and inspection effect.

In a further optimized scheme, the power storage control system comprises an energy mechanism and a control mechanism; the energy mechanism comprises a telescopic plug component, an energy storage component 7 and a charging head 8; the fixed end of the telescopic plug component is installed in the shield tail 1, and the control mechanism, the energy storage component 7 and the charging head 8 are all installed on the bottom plate 9; and the energy storage component 7 adopts an energy storage module for supplying power to the equipment;

the telescopic end of the telescopic plug component is plugged with the charging head 8; the charging head 8, the telescopic plug component, the camera 4, the stabilizer component, the traveling mechanism, the reel driving part and the energy storage component 7 are all electrically connected with the control mechanism;

with this arrangement, when the control mechanism inspects that the electric quantity of the energy storage component 7 is lower than the preset threshold, the control traveling mechanism of the control mechanism drives the bottom plate 9 to move to the vicinity of the telescopic plug component along the rail 2. And at the same time controls the telescopic plug component to be completely extended to be flush with the charging head 8, and the control traveling mechanism drives the bottom plate 9 to continue moving along the rail 2. When the charging head 8 is meshed with the telescopic end of the telescopic plug component and the control mechanism inspects that the energy storage component 7 has electric energy input, the traveling mechanism stops moving and starts charging the energy storage component 7;

when the energy storage component 7 is fully charged, the control traveling mechanism of the control mechanism drives the bottom plate 9 to move along the rail 2, so that the charging head 8 is separated from the telescopic end of the telescopic plug component. And at the same time, the telescopic plug component is controlled to retract, so as to accommodate and improve the safety performance and cleanliness; the energy storage component 7 adopts wireless power supply, which can reduce the loss and cost, make the whole structure lighter and more suitable for the construction of shield machine in harsh environment.

In a further optimized scheme, the traveling mechanism comprises a traveling motor 10, a gear shaft 11 and a traveling wheel 12;

the traveling motor 10 is installed on the bottom plate 9, and the first transmission oblique bevel gear 13 is installed on the output shaft of the traveling motor 10; and the traveling motor 10 is electrically connected with the control mechanism;

the gear shaft 11 is rotatably connected to the bottom plate 9, and the top and bottom of the gear shaft 11 are respectively provided with the second transmission oblique bevel gear 14 and an active traveling bevel gear 15; the second transmission oblique bevel gear 14 is in meshing transmission with the first transmission oblique bevel gear 13; and the active traveling bevel gear 15 is in meshing transmission with the rail 2;

at least four traveling wheels 12 are arranged, the traveling wheels 12 are rotatably connected to the bottom plate 9 through a wheel axle 16, the four traveling wheels 12 are symmetrically arranged on both sides of the rail 2, and the traveling wheels 12 are in meshing transmission with the rail 2;

with this arrangement, the traveling motor 10 starts to drive the first transmission oblique bevel gear 13 to rotate, and then drives the second transmission oblique bevel gear 14, the gear shaft 11 and the active traveling bevel gear 15 to rotate. Through the meshing transmission between the active traveling bevel gear 15 and the rail 2, the movement of the bottom plate 9 along the rail 2 is realized, and the adjustment of the inspection position is further realized; by arranging at least four traveling wheels 12, the stability of the moving process of the bottom plate 9 can be improved, and the inspection effect can be further improved.

In a further optimized scheme, the rail 2 is provided with a plurality of sections, and the sections of the rail 2 are detachably connected end to end in sequence; the rail 2 comprises a base rail 201 installed on the shield tail 1, a gear rail 203 is installed on the base rail 201, and a wheel rail 202 is installed on the gear rail 203;

a plurality of rail fixing heads 204 are installed between the base rail 201 and the shield tail 1, and a plurality of sections of the base rail 201 are detachably connected end to end in sequence; the active traveling bevel gear 15 is in meshing transmission with the gear rail 203; and the traveling wheel 12 is in meshing transmission with the wheel rail 202;

the number of sections of the rail 2 to be installed can be adjusted according to the size of the shield tail 1 and the actual inspection requirements;

with this arrangement, the transportation of the rail 2 is facilitated through the modular design; the active traveling bevel gear 15 is in meshing transmission with the gear rail 203; the traveling wheel 12 is in meshing transmission with the wheel rail 202 to realize the movement of the bottom plate 9; and the connection stability between the base rail 201 and the shield tail 1 is improved by a plurality of rail fixing heads 204.

In a further optimized scheme, the reel driving part comprises a film shaft base 17 installed on the bottom plate 9, and the film shaft base 17 is installed on one side of the camera box; the film shaft base 17 is provided with a film output reel 19, a tensioning part, a sealing part, a film input reel 20, a reel motor 21 and a plurality of film shafts 22; the reel motor 21 is installed on the film shaft base 17 through the reel motor base;

the reel motor 21 is electrically connected with the control mechanism; the output shaft of the reel motor 21 is in transmission connection with the film input reel 20 through a coupling, one end of the cleaning film 6 is installed on the film input reel 20, and the other end is installed on the film output reel 19; and the middle section of the cleaning film 6 penetrates around a plurality of film shafts 22, the tensioning part and the sealing part; the film shaft base 17 is provided with a plurality of scrapers which are in sliding contact with the surface of the cleaning film 6;

the tensioning part comprises two tensioner rear ends 23, and the two tensioner rear ends 23 are respectively installed on both sides of the film shaft base 17, and tensioner front ends 24 are installed on the tensioner rear ends 23, and an elastic piece connected with the tensioner front end 24 is installed in the tensioner rear end 23, and the tensioner front end 24 is in sliding contact with the surface of the cleaning film 6; the cleaning film 6 is tensioned by the tensioning part;

the sealing part comprises two impeller shells 25, and the two impeller shells 25 are respectively installed on two sides of the film shaft base 17, an elastic impeller 26 is arranged in the impeller shell 25, and a torsion spring is installed between the two sides of the elastic impeller 26 and the inner wall of the impeller shell 25; and the cleaning film 6 is abutted by the elastic impeller 26.

With this arrangement, when in use, the sealing shell 35 is opened, a new roll of cleaning film 6 is installed on the film output reel 19, and then one end is pulled out from the cleaning film 6 to cover the film shaft 22, the tensioning part and the sealing part in turn, and finally fixed on the film input reel 20; when it is inspected that the pictures taken by the camera 4 are not clear and there are many obstructions, the power storage control system controls the reel motor 21 to start, transmits power to the film input reel 20 through the coupling, moves the polluted cleaning film 6 in front of the lens into the film input reel, and at the same time, the camera 4 starts shooting until the pictures taken by the camera 4 are clear and free from impurities and obstructions, and then the reel motor 21 stops working, thus realizing the automatic cleaning of the camera 4, effectively reducing the manual operation intensity and improving the intelligent performance of the device;

the scraper is in sliding contact with the surface of the cleaning film 6, so that impurities on the surface of the cleaning film 6 can be scraped when the cleaning film 6 moves, so that they can be recycled by the film input reel 20; when the cleaning film 6 is at rest, the elastic impeller 26 presses the cleaning film 6 against the inner wall of the film shaft base 17 under the action of the torsion spring, thus keeping the device sealed; when the elastic impeller 26 moves in the cleaning film 6, the torsion spring is compressed, and a gap is left between the rotation of the elastic impeller 26 and the cleaning film 6 to facilitate the cleaning film 6 to move.

In a further optimized scheme, the camera box comprises a camera box body 28 and a camera box upper baffle 29, wherein the camera box body 28 is installed in the shell, and the camera box upper baffle 29 is installed at the top of the camera box body 28; the film shaft base 17 is installed at one side of the camera box body 28; the glass sheet 5 is installed on the camera box body 28, and the glass sheet 5 is located right above the lens of the camera 4;

the stabilizer component comprises a stabilizer front arm 30, a stabilizer middle arm 31, a stabilizer rear arm 32 and a stabilizer base 33; the stabilizer rear arm 32 is installed in the camera box body 28 through the stabilizer base 33, one end of the stabilizer front arm 30 is installed on the stabilizer middle arm 31, and the other end is installed with the camera 4, and one end of the stabilizer middle arm 31 far away from the stabilizer front arm 30 is installed on the stabilizer rear arm 32;

Micro motors are arranged in the stabilizer front arm 30, the stabilizer middle arm 31 and the stabilizer rear arm 32;

with this arrangement, when the inspection platform 3 shakes, the control mechanism controls the movement of the three micro motors, so that the camera 4 remains stable and the imaging effect and inspection efficiency are improved.

In a further optimized scheme, the shell comprises a platform shell 34, a sealing shell 35 and a back cover 36; the platform shell 34 is installed on the bottom plate 9, and the sealing shell 35 and the back cover 36 are both installed on the platform shell 34; the film shaft base 17 is installed in the sealing shell 35, and the top of the platform shell 34 is provided with the opening.

In a further optimized scheme, the telescopic plug component comprises a telescopic plug shell 37, a charging plug 38 and a telescopic pushing rod 39; the telescopic plug shell 37 is installed in the shield tail 1, and the top surface of the telescopic plug shell 37 is arranged flush with the plane of the shield tail 1; the telescopic pushing rod 39 is installed in the telescopic plug shell 37, the telescopic pushing rod 39 is electrically connected with the control mechanism, the charging plug 38 is installed at the telescopic end of the telescopic pushing rod 39, and the charging plug 38 is plugged with the charging head 8;

the charging head 8 comprises a plug main body 801 and four copper sheets 802, wherein the four copper sheets 802 are symmetrically installed on the plug main body 801, the plug main body 801 is electrically connected with the control mechanism, and both sides of the copper sheets 802 are set as inclined planes;

with this arrangement, the charging plug 38 is driven to extend and contract by the telescopic pushing rod 39, so that the charging plug 38 can be extended, charged and retracted, and both sides of the copper sheet 802 are set with inclined planes to facilitate the matching and plugging with the charging plug 38.

In a further optimized scheme, at least two oil boxes 18 are installed on the bottom plate 9, and the oil boxes 18 are used for meshing and lubricating the traveling wheels 12 and wheel rails 202, so as to improve the operation stability.

In a further optimized scheme, a drying component is installed in the platform shell 34 to keep the air in the platform shell 34 dry, and the drying component can be disassembled and replaced periodically. The internal structure and working principle of the drying component are all in the current technology, and will not be described here.

In the description of the present invention, it should be understood that the orientation or positional relationship indicated by the terms "longitudinal", "lateral", "upper", "lower", "front", "rear", "left", "right", "vertical", "horizontal", "top", "bottom", "inner" and "outer" is based on the orientation or positional relationship shown in the attached drawings, which is only for the convenience of describing the present invention, and does not indicate or imply that the indicated device or element must have a specific orientation, be constructed and operated in a specific orientation, so it cannot be understood as limiting the present invention.

The above-mentioned embodiments only describe the preferred mode of the present invention, and do not limit the scope of the present invention. Under the premise of not departing from the design spirit of the present invention, various modifications and improvements made by ordinary technicians in the field to the technical scheme of the present invention shall fall within the protection scope determined by the claims of the present invention.

What is claimed is:

1. A movable visual inspection device for shield machines, wherein, it comprises a rail (2) and an inspection platform (3), wherein the rail (2) is installed on a shield tail (1); the inspection platform (3) comprises a bottom plate (9) arranged on the rail (2), and the bottom plate (9) is provided with a shell, a cleaning mechanism, a power storage control system and a traveling mechanism; the shell is internally provided with a visual inspection mechanism; and the traveling mechanism is used for driving the bottom plate (9) to move along the rail (2); the visual inspection mechanism comprises a camera box, a camera (4) and a stabilizer component, wherein the camera (4) is installed in the camera box through the stabilizer component, and the camera box is installed in the shell; the cleaning mechanism comprises a glass sheet (5), a reel driving part and a cleaning film (6); the reel driving part is installed on the bottom plate (9) and used for driving the cleaning film (6) to rotate; the bottom surface of the cleaning film (6) is in sliding contact with the glass sheet (5), and the glass sheet (5) is installed on the camera box and located above a lens of the camera (4); the shell is provided with an opening, and the opening is arranged opposite to the lens of the camera (4); the camera (4), the stabilizer component, the traveling mechanism and the reel driving part are all electrically connected with the power storage control system.

2. The movable visual inspection device for shield machines as claimed in claim 1, wherein, the power storage control system comprises an energy mechanism and a control mechanism; the energy mechanism comprises a telescopic plug component, an energy storage component (7) and a charging head (8); a fixed end of the telescopic plug component is installed in the shield tail (1), and the control mechanism, the energy storage component (7) and the charging head (8) are all installed on the bottom plate (9); a telescopic end of the telescopic plug component is plugged with the charging head (8); the charging head (8), the telescopic plug component, the camera (4), the stabilizer component, the traveling mechanism, the reel driving part and the energy storage component (7) are all electrically connected with the control mechanism.

3. The movable visual inspection device for shield machines as claimed in claim 2, wherein, the traveling mechanism comprises a traveling motor (10), a gear shaft (11) and a traveling wheel (12); the traveling motor (10) is installed on the bottom plate (9), and a first transmission oblique bevel gear (13) is installed on an output shaft of the traveling motor (10); and the traveling motor (10) is electrically connected with the control mechanism; the gear shaft (11) is rotatably connected to the bottom plate (9), and a top and bottom of the gear shaft (11) are respectively provided with a second transmission oblique bevel gear (14) and an active traveling bevel gear (15); the second transmission oblique bevel gear (14) is in meshing transmission with the first transmission oblique bevel gear (13); and the active traveling bevel gear (15) is in meshing transmission with the rail (2); at least four traveling wheels (12) are arranged, the traveling wheels (12) are rotatably connected to the bottom plate (9) through a wheel axle (16), the four traveling wheels (12) are symmetrically arranged on both sides of the rail (2), and the traveling wheels (12) are in meshing transmission with the rail (2).

4. The movable visual inspection device for shield machines as claimed in claim 3, wherein, the rail (2) is provided with a plurality of sections, and the sections of the rail (2) are detachably connected end to end in sequence; the rail (2) comprises a base rail (201) installed on the shield tail (1), a gear rail (203) is installed on the base rail (201), and a wheel rail (202) is installed on the gear rail (203); a plurality of rail fixing heads (204) are installed between the base rail (201) and the shield tail (1), and a plurality of sections of the base rail (201) are detachably connected end to end in sequence; the active traveling bevel gear (15) is in meshing transmission with the gear rail (203); and the traveling wheel (12) is in meshing transmission with the wheel rail (202).

5. The movable visual inspection device for shield machines as claimed in claim 3, wherein, at least two oil boxes (18) are installed on the bottom plate (9), and the oil boxes (18) are used for meshing and lubricating the traveling wheels (12) and wheel rails (202).

6. The movable visual inspection device for shield machines as claimed in claim 2, wherein, the reel driving part comprises a film shaft base (17) installed on the bottom plate (9), and the film shaft base (17) is installed on one side of the camera box; the film shaft base (17) is provided with a film output reel (19), a tensioning part, a sealing part, a film input reel (20), a reel motor (21) and a plurality of film shafts (22); the reel motor (21) is installed on the film shaft base (17) through a reel motor base; the reel motor (21) is electrically connected with the control mechanism; an output shaft of the reel motor (21) is in transmission connection with the film input reel (20) through a coupling, one end of the cleaning film (6) is installed on the film input reel (20), and the other end is installed on the film output reel (19); and a middle section of the cleaning film (6) penetrates around a plurality of film shafts (22), the tensioning part and the sealing part; the film shaft base (17) is provided with a plurality of scrapers which are in sliding contact with a the surface of the cleaning film (6); the tensioning part comprises two tensioner rear ends (23), and the two tensioner rear ends (23) are respectively installed on both sides of the film shaft base (17), and tensioner front ends (24) are installed on the tensioner rear ends (23), and an elastic piece connected with the tensioner front end (24) is installed in the tensioner rear end (23), and the tensioner front end (24) is in sliding contact with the surface of the cleaning film (6); the sealing part comprises two impeller shells (25), and the two impeller shells (25) are respectively installed on two sides of the film shaft base (17), an elastic impeller (26) is arranged in the impeller shell (25), and a torsion spring is installed between the two sides of the elastic impeller (26) and an the inner wall of the impeller shell (25); and the cleaning film (6) is abutted by the elastic impeller (26).

7. The movable visual inspection device for shield machines as claimed in claim 6, wherein, the camera box comprises a camera box body (28) and a camera box upper baffle (29), wherein the camera box body (28) is installed in the shell, and the camera box upper baffle (29) is installed at the top of the camera box body (28); the film shaft base (17) is installed at one side of the camera box body (28); the glass sheet (5) is installed on the camera box body (28), and the glass sheet (5) is located right above the lens of the camera (4); the stabilizer component comprises a stabilizer front arm (30), a stabilizer middle arm (31), a stabilizer rear arm (32) and a stabilizer base (33); the stabilizer rear arm (32) is installed in the camera box body (28) through the stabilizer base (33), one end of the stabilizer front arm (30) is installed on the stabilizer middle arm (31), and the other end is installed with the camera (4), and one end of the stabilizer middle arm (31) far away from the stabilizer front arm (30) is installed on the stabilizer rear arm (32).

8. The movable visual inspection device for shield machines as claimed in claim 6, wherein, the shell comprises a platform shell (34), a sealing shell (35) and a back cover (36); the platform shell (34) is installed on the bottom plate (9), and the sealing shell (35) and the back cover (36) are both installed on the platform shell (34); the film shaft base (17) is installed in the sealing shell (35), and a top of the platform shell (34) is provided with the opening.

9. The movable visual inspection device for shield machines as claimed in claim 8, wherein, a drying component is installed in the platform shell (34).

10. The movable visual inspection device for shield machines as claimed in claim 2, wherein, the telescopic plug component comprises a telescopic plug shell (37), a charging plug (38) and a telescopic pushing rod (39); the telescopic plug shell (37) is installed in the shield tail (1), and a top surface of the telescopic plug shell (37) is arranged flush with a plane of the shield tail (1); the telescopic pushing rod (39) is installed in the telescopic plug shell (37), the telescopic pushing rod (39) is electrically connected with the control mechanism, the charging plug (38) is installed at a telescopic end of the telescopic pushing rod (39), and the charging plug (38) is plugged with the charging head (8); the charging head (8) comprises a plug main body (801) and four copper sheets (802), wherein the four copper sheets (802) are symmetrically installed on the plug main body (801), the plug main body (801) is electrically connected with the control mechanism, and both sides of the copper sheets (802) are set as inclined planes.

* * * * *